US011434694B2

United States Patent
Herbig et al.

(10) Patent No.: US 11,434,694 B2
(45) Date of Patent: Sep. 6, 2022

(54) AUTOMATED SPIRALING DETECTION

(71) Applicants: Christian Herbig, Celle (DE); Hanno Reckmann, Nienhagen (DE); Wojciech Emmerich, Celle (DE); Oliver Hoehn, Hannover (DE); Christian Linke, Hannover (DE); Jens-Uwe Bruns, Burgdorf (DE); Andreas Hohl, Hannover (DE); Hatem Oueslati, Hannover (DE); Ingo Forstner, Ahnsbeck (DE)

(72) Inventors: Christian Herbig, Celle (DE); Hanno Reckmann, Nienhagen (DE); Wojciech Emmerich, Celle (DE); Oliver Hoehn, Hannover (DE); Christian Linke, Hannover (DE); Jens-Uwe Bruns, Burgdorf (DE); Andreas Hohl, Hannover (DE); Hatem Oueslati, Hannover (DE); Ingo Forstner, Ahnsbeck (DE)

(73) Assignee: BAKER HUGHES INCORPORATED, Houston, TX (US)

(*) Notice: Subject to any disclaimer, the term of this patent is extended or adjusted under 35 U.S.C. 154(b) by 350 days.

(21) Appl. No.: 16/026,670

(22) Filed: Jul. 3, 2018

(65) Prior Publication Data
US 2018/0313155 A1 Nov. 1, 2018

Related U.S. Application Data

(63) Continuation of application No. 14/526,805, filed on Oct. 29, 2014, now Pat. No. 10,036,203.

(51) Int. Cl.
*E21B 7/00* (2006.01)
*E21B 3/00* (2006.01)
(Continued)

(52) U.S. Cl.
CPC .............. *E21B 7/00* (2013.01); *E21B 3/00* (2013.01); *E21B 44/00* (2013.01); *E21B 47/02* (2013.01); *G05B 13/021* (2013.01)

(58) Field of Classification Search
CPC . E21B 7/00; E21B 47/02; E21B 44/00; E21B 3/00
See application file for complete search history.

(56) References Cited

U.S. PATENT DOCUMENTS 5,058,077 A 10/1991 Twist
5,358,059 A 10/1994 Ho
(Continued)

FOREIGN PATENT DOCUMENTS

WO 03064812 A1 8/2003

OTHER PUBLICATIONS

Inglis, T. A. "Deflection Tools and Techniques." Directional Drilling. Springer, Dordrecht, 1987. 13-39. (Year: 1987).*
(Continued)

*Primary Examiner* — Michael D Masinick
(74) *Attorney, Agent, or Firm* — Cantor Colburn LLP

(57) ABSTRACT

An embodiment of a method of detecting and correcting for spiraling in a downhole carrier includes: deploying the carrier in a borehole in an earth formation as part of a subterranean operation; acquiring time based data from at least one sensor disposed at the carrier; acquiring time and depth data, the time and depth data correlating time values with depths of the carrier; generating a depth based profile based on the time based data and the time and depth data; generating a frequency profile by transforming the depth based profile into the frequency domain; detecting a spiraling event based on an amplitude of the frequency profile; and taking corrective action based on detecting the spiraling event.

20 Claims, 10 Drawing Sheets

(51) Int. Cl.
*E21B 44/00* (2006.01)
*E21B 47/02* (2006.01)
*G05B 13/02* (2006.01)

(56) References Cited

U.S. PATENT DOCUMENTS

| | | | |
|---|---|---|---|
| 5,579,248 A | 11/1996 | Nieto et al. | |
| 6,047,602 A * | 4/2000 | Lynnworth | G01F 1/662 |
| | | | 73/632 |
| 6,049,757 A | 4/2000 | Sijercic et al. | |
| 6,691,036 B2 | 2/2004 | Blanch et al. | |
| 6,725,162 B2 | 4/2004 | Edwards et al. | |
| 6,736,209 B2 | 5/2004 | Ivannikov et al. | |
| 7,165,451 B1 | 3/2007 | Brooks et al. | |
| 7,260,477 B2 | 8/2007 | Haugland | |
| 7,295,928 B2 | 11/2007 | Hassan et al. | |
| 7,503,403 B2 | 3/2009 | Jogi et al. | |
| 7,680,600 B2 | 3/2010 | Carnegie et al. | |
| 7,999,695 B2 | 8/2011 | Rodney et al. | |
| 8,401,794 B2 | 3/2013 | Samworth | |
| 8,636,060 B2 | 1/2014 | Hernandez | |
| 8,655,104 B2 * | 2/2014 | Zhang | G01V 3/18 |
| | | | 340/853.1 |
| 10,036,203 B2 | 7/2018 | Herbig et al. | |
| 10,329,896 B2 | 6/2019 | Bang et al. | |
| 2003/0037964 A1 * | 2/2003 | Sinor | E21B 10/43 |
| | | | 175/57 |
| 2004/0149431 A1 * | 8/2004 | Wylie | C09K 8/12 |
| | | | 166/242.1 |
| 2006/0271299 A1 | 11/2006 | Ward et al. | |
| 2008/0052335 A1 | 2/2008 | Gee | |
| 2009/0308616 A1 | 12/2009 | Wylie et al. | |
| 2010/0175922 A1 | 7/2010 | Ignova et al. | |
| 2010/0322533 A1 * | 12/2010 | Zhang | G01V 1/48 |
| | | | 382/275 |
| 2011/0038559 A1 | 2/2011 | Sugiura et al. | |
| 2011/0198126 A1 | 8/2011 | Swietlik et al. | |
| 2013/0054203 A1 * | 2/2013 | Herbig | E21B 44/00 |
| | | | 703/2 |
| 2013/0341091 A1 | 12/2013 | Sugiura | |
| 2014/0151121 A1 | 6/2014 | Boone et al. | |
| 2015/0159447 A1 | 6/2015 | Miller et al. | |
| 2015/0218887 A1 | 8/2015 | Bayliss | |
| 2016/0348493 A1 * | 12/2016 | Hohl | E21B 44/04 |

OTHER PUBLICATIONS

Marek, et al.; "Analysis of spiraled borehole data using novel directional drilling model"; IADC/SPE Drilling Conference and Exhibition; Fort Worth, Texas, USA; Mar. 4-6, 2014; 18 pages.

Ask, et al, "Detectection of potential borehole breakouts in borehols KFM01A and KFM01B", P-07-235, Forsmark site investigation, Dec. 2007, 55 pages.

Barber et al., "Real-Time Openhole Evaluation", Oilfield Review, Summer 1999, pp. 36-57.

Junichi Sugiura, et al., "Improving Rotary-Steerable Borehole Quality Using Innovative Imaging Techniques", Offshore Technology Conference, May 4-7, 2009; 10 pages.

G. Heisig, et al., Continuous Borehole Curvature Estimate4s While Drilling Based on Downhole Bending Moment Measurements, SPE International 90794, 2004, pp. 1-14.

Hamer et al; The Trouble with Bits—A Holistic Approach to Drilling Optimization, SPE International 93910, 2005, pp. 1-12.

International Search Report and the Written Opinion of the International Searching Authority, or the Declaration; PCT/US2015/057703; dated Jan. 25, 2016; 9 pages.

* cited by examiner

AUTOMATED SPIRALING DETECTION

CROSS REFERENCE TO RELATED APPLICATIONS

This application is a continuation and claims the benefit of U.S. patent application Ser. No. 14/526,805, entitled "AUTOMATED SPIRALING DETECTION," filed Oct. 29, 2014, the disclosure of which is incorporated by reference herein in its entirety.

BACKGROUND

Earth formations may be used for various purposes such as hydrocarbon production, geothermal production, and carbon dioxide sequestration. These reservoirs are typically accessed by drilling boreholes through the earth to the reservoirs.

A borehole is drilled using a drill bit that is rotated via a drill string. The drill bit may be rotated by applying forces including rotational force or torque for rotating the drill string, weight on the drill bit, and force due to the flow of drilling fluid internal to the drill string. The combination of the drill string forces applied to the drill string result in a rate of penetration into the formation being drilled. In some cases, steering systems are employed to drill the borehole along selected trajectories, which may include deviated and/or horizontal sections.

Due to rotation of various components of the drill string, portions of the drill string can deform, which can result in a spiraling effect. This spiraling effect can result in conditions such as increased rugosity (roughness or variations in diameter of the borehole), deviation of the borehole trajectory from a planned trajectory, and/or a spiral borehole. These conditions can have deleterious effects on subterranean operations, e.g., by causing the borehole to penetrate less than ideal formation areas, or by negatively affecting measurements sensitive to standoff, such as resistivity and neutron measurements.

BRIEF SUMMARY

An embodiment of a method of detecting and correcting for spiraling in a downhole carrier includes: deploying the carrier in a borehole in an earth formation as part of a subterranean operation; acquiring time based data from at least one sensor disposed at the carrier; acquiring time and depth data, the time and depth data correlating time values with depths of the carrier; generating a depth based profile based on the time based data and the time and depth data; generating a frequency profile by transforming the depth based profile into the frequency domain; detecting a spiraling event based on an amplitude of the frequency profile; and taking corrective action based on detecting the spiraling event.

An embodiment of a system for detecting and correcting for spiraling in a downhole carrier includes: a carrier configured to be deployed in a borehole in an earth formation as part of a subterranean operation; at least one sensor disposed at the carrier, the at least one sensor configured to generate time based data based on measurements performed downhole; and a processor configured to receive the time based data and acquire time and depth data, the time and depth data correlating time values with depths of the carrier. The processor is configured to perform: generating a depth based profile based on the time based data and the time and depth data; generating a frequency profile by transforming the depth based profile into the frequency domain; detecting a spiraling event based on an amplitude of the frequency profile; and taking corrective action based on detecting the spiraling event.

BRIEF DESCRIPTION OF THE DRAWINGS

The following descriptions should not be considered limiting in any way. With reference to the accompanying drawings, like elements are numbered alike:

FIG. 5-1 depicts an example of inclination data produced according to the method of FIG. 4, where depth information is acquired by surface measurements;

FIG. 5-2 depicts spectrograms of the inclination data of FIG. 5-1;

FIG. 5-3 depicts spiraling indicator data corresponding to the inclination data of FIG. 5-1;

FIG. 6-1 depicts another example of inclination data produced according to the method of FIG. 4, wherein depth information is estimated downhole;

FIG. 6-2 depicts spectrograms of the inclination data of FIG. 6-1; and

FIG. 6-3 depicts spiraling indicator data corresponding to the inclination data of FIG. 6-1.

DETAILED DESCRIPTION

A detailed description of one or more embodiments of the disclosed apparatus and method presented herein by way of exemplification and not limitation with reference to the figures.

Disclosed are systems, apparatuses and methods for automated spiraling detection during drilling into an earth formation. Spiraling is identified or detected, and may be assessed to determine whether the level of spiraling warrants corrective action. The methods described herein may be performed in real time during drilling or other subterranean operations, or may be performed offline subsequent to drilling. In addition, the methods and calculations may be performed on the surface and/or downhole (e.g., in a bottomhole assembly).

An embodiment of a method includes acquiring time based data indicating parameters of a drill string or other carrier. Examples of such time based data include directional data such as inclination and azimuth, and non-directional data such as bending moment data. The time based data may be acquired in real time from downhole sensors such as inclination sensors, or acquired from a data storage. The method also includes acquiring time and depth data (also referred to as time-depth data or a time-depth profile) indicating depth as a function of time. A depth based signal or profile is generated based on the time based data and the time-depth data, and the depth based signal is transformed into a frequency domain. Spiraling can be identified and/or assessed based on the resulting frequency domain data, e.g., by identifying frequencies having a relatively high amplitude or energy. The identified spiraling can be used to correlate with events related to spiraling, adjust or control drilling parameters to mitigate spiraling effects, and/or notify a user or remote processing device.

Figure 1:
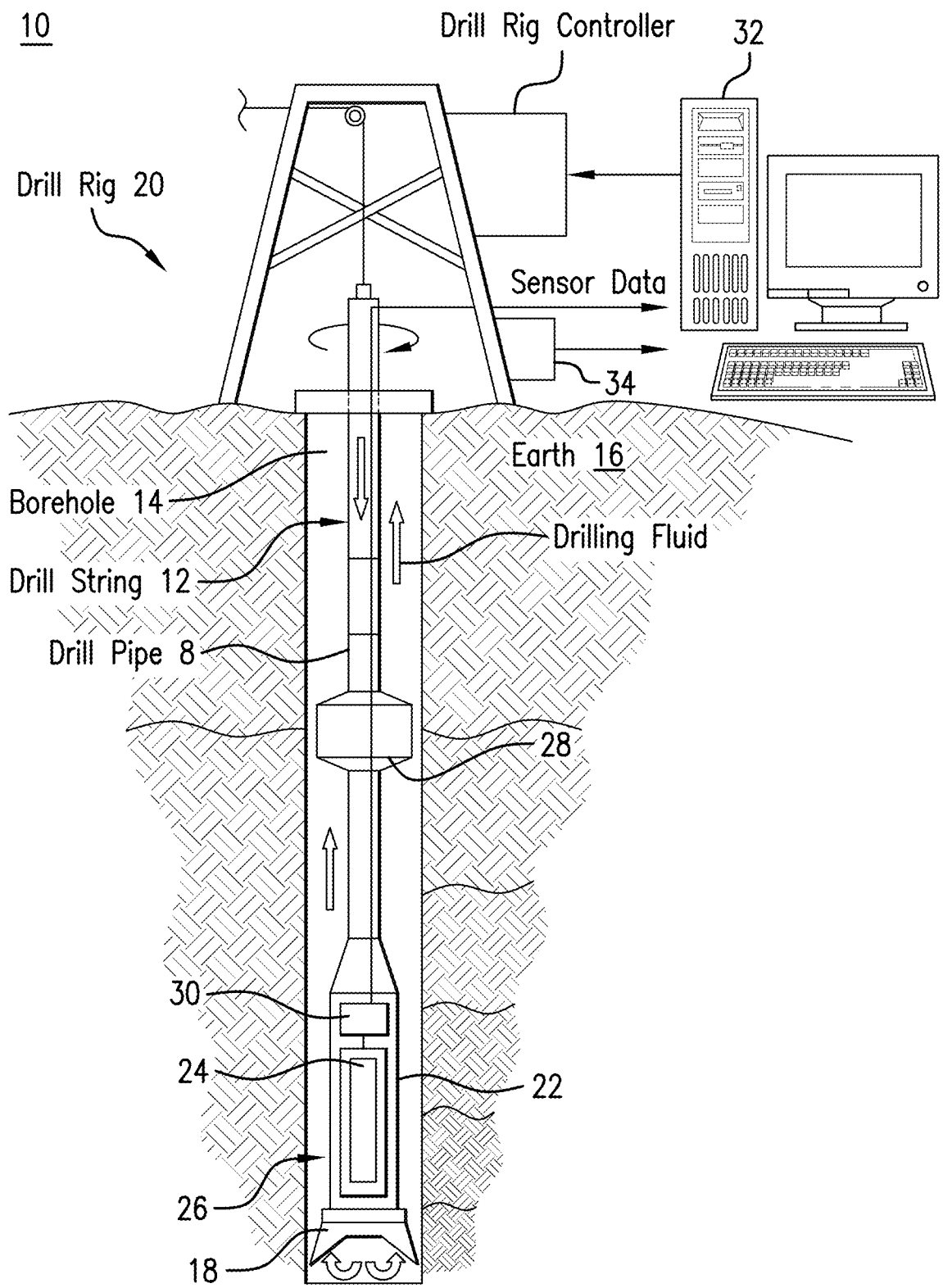
FIG. 1 illustrates a cross-sectional view of an exemplary embodiment of a drill string disposed in a borehole penetrating the earth.

Referring to FIG. 1, an embodiment of a system 10 configured for performing downhole operations, such as drilling and completion. The system 10 includes a borehole string 12 disposed in a borehole 14 in an earth formation 16. In this embodiment, the borehole string 12 is a drill string that includes a drill bit 18. Although embodiments are described herein in conjunction with drilling operations, they are not so limited. The systems, apparatuses and methods described herein can be used with any carrier that includes rotating components. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

A drill rig 20 is configured to conduct drilling operations such as rotating the drill string and the drill bit, e.g., using a drill rig controller or other processing or control device. The drill rig and/or processing device may perform various functions, such as operational control, data collection and monitoring. For example, the drill rig 20 controls the weight-on-bit, rotational rate and/or torque applied to the drill bit 18, controls the pressure and flow rate of drilling fluid that is injected into the drill string 12 during drilling, and may control other operational parameters that apply force or energy to the drill string 12.

The system 10 also includes one or more sensing devices or tools for measuring properties or parameters of the borehole string, borehole, operation and/or formation. An exemplary tool 22 includes sensors 24 such as an accelerometer, a gravity sensor, a bending moment sensor and/or a magnetic field sensor for measuring inclination and azimuthal orientation. The drill bit 18 and the tool 22 may be disposed, for example, in a bottomhole assembly (BHA) 26 disposed on the drill string. Other components such as a stabilizer 28, reamers, a mud motor and/or steering components may be included.

Any number of sensing tools or devices may be disposed with the borehole string. For example, sensors may be included for measuring physical properties associated with drilling the borehole, such as vibration (such as axial vibration, lateral vibration, and/or torsional vibration), abnormal drill bit motion (such as drill bit whirl and/or stick slip), gas detection in borehole, and borehole pressure. Lithology or formation measurement devices may be included, such as a radiation detector, a neutron tool, a resistivity tool, a sampling tool, and others.

Downhole electronics 30 may be coupled to the sensors and configured to operate the downhole sensors 24, process sensor measurement data obtained downhole, and/or act as an interface with telemetry to communicate data or commands between the downhole sensors and a surface processing unit 32 disposed at the surface. Non-limiting embodiments of the telemetry include mud pulse and wired drill pipe. Downhole sensor operation and data processing operations, including the spiraling detection and assessment methods described herein, may be performed by the downhole electronics 30, the surface processing unit 32, or a combination thereof. The downhole sensors 24 may be operated continuously as the borehole is being drilled or a discrete selected depths in the borehole. Surface drilling parameters may be sensed by a surface drilling parameter sensor 34. Non-limiting embodiments of surface drilling parameters sensed by the sensor 34 include depth (distance to the drill bit) weight-on-bit, torque applied to the drill string, rotational speed, drilling fluid flow rate, borehole pressure, and borehole gas. As described herein, "depth" refers to a distance along the borehole, e.g., the distance from a surface location along the borehole to a location downhole. The depth may represent vertical depth in the case of a vertical borehole (or vertical portion), and/or may represent a length along a non-vertical (e.g., deviated, horizontal) portion of the borehole.

A processing device, such as the surface processing unit, is configured to automatically determine hole spiraling in real-time (or offline) at the surface or in a downhole location. In one embodiment, deflection of the borehole trajectory relative to a planned or desired trajectory, is derived or estimated from the determined hole spiraling. The processing device acquires directional data (e.g., inclination data) and time-depth data. This data may be acquired from downhole sensors (e.g., sensors 24), surface sensors (e.g., the surface drilling parameter sensor 34), or a combination thereof.

The methods described herein for detection and assessment of spiraling are based on the recognition that spiraling creates an oscillating component of inclination, azimuth, bending moment or other directional or non-directional signals, which in some cases can be generally sinusoidal. In contrast, signals generated by a non-spiraling drill string exhibit constant inclination or a relatively steady change in inclination.

Accordingly, an embodiment of a method includes acquiring inclination or other time based measurement data from downhole sensors (e.g., gravity and/or bending moment sensors), and also acquiring time-depth information. The downhole sensors in one embodiment are disposed at or near a drill bit, drilling assembly, BHA, and/or at selected distances from the drill bit. The time-depth information is derived by estimating depth at various times during the drilling operation, which can be estimated or measured on the surface and/or downhole. The time based data and time-depth data are combined to generate a depth based signal (e.g., a depth based inclination signal or data set), indicating inclination as a function of depth. The depth based signal is transformed into a frequency domain in order to identify any oscillations associated with spiraling. The resulting frequency spectrum or profile can be analyzed to determine whether spiraling is or has occurred. For example, if the energy content of the resulting frequency spectrum is generally evenly distributed, it can be determined that significant spiraling is or has not occurred. However, if the energy content is concentrated at specific frequencies or wavenumbers (the amplitude of the spectrum at specific frequencies is significantly greater than others), it can be determined that spiraling is occurring or has occurred. It is noted that data resulting from transformation into the frequency domain, such as a frequency spectrum or spectrogram, may be generally referred to as a frequency profile.

In one embodiment, the frequency spectrum is analyzed or assessed to identify spiraling at specific locations along a drill string, borehole string or other carrier. For example, one or more locations along the drill string are selected, each location having a distance from a drill bit. Exemplary locations include locations of components such as steering units or stabilizers. For each location, a wavelength and corresponding frequency or wavenumber is identified. Spiraling is identified at a selected location if the amplitude or energy at the corresponding wavenumber exceeds a limit or threshold. If spiraling exceeds the threshold, the method may include taking corrective action, e.g., generating an alert or notification and/or modifying operational parameters.

The derived spiraling information can be used to correlate phenomena or incidents related to hole spiraling. Such phenomena or incidents include, e.g., build problems, high bending moment resulting from deflection due to hole spiraling, and sensor problems, especially for sensors that are sensitive to varying distance between sensors and a borehole wall. The information may also be used to react to occurring hole spiraling incidents and to mitigate such incidents. This could be done, for example, by providing the gathered information to a directional driller or other responsible field person. In addition, in the case of a fully automated drilling system, the information can be forwarded and used in a control system to take immediate action and thereby eliminate the spiraling.

Figure 2:
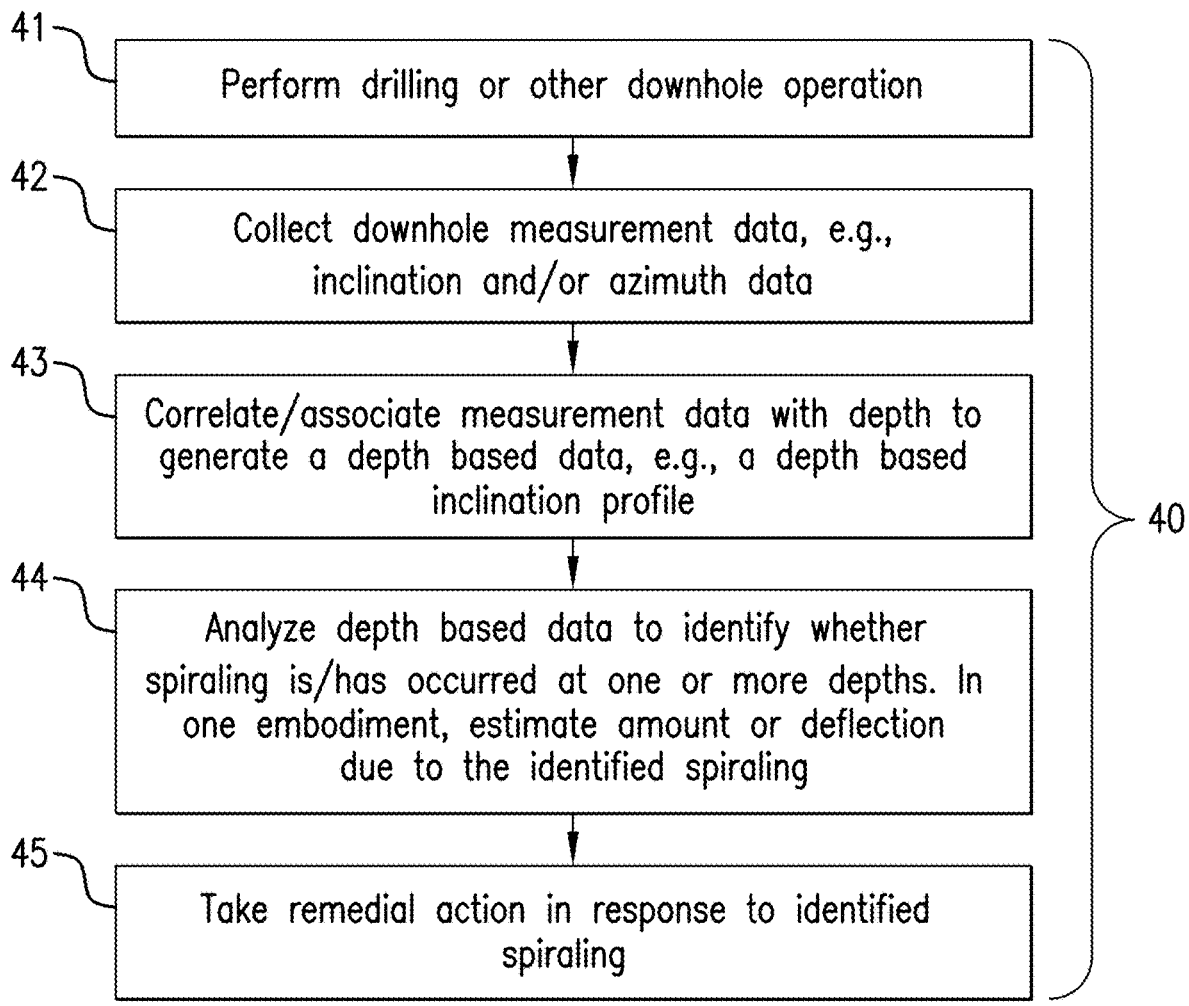
FIG. 2 is a flow chart illustrating a method for detecting and estimating spiraling of a downhole component.

FIG. 2 illustrates an embodiment of a method 40 of performing a downhole operation such as a drilling operation, and identifying and estimating spiraling exhibited by a drill string or other carrier. The method 40 includes one or more stages 41-45. Although the method 40 is described in conjunction with the drill string and system 10 of FIG. 1, the method 40 is not limited to use with these embodiments. In one embodiment, the method 40 includes the execution of all of stages 41-45 in the order described. However, certain stages may be omitted, stages may be added, or the order of the stages changed.

In the first stage 41, a drilling or other downhole operation is performed, in which a drill string or other carrier is advanced through an earth formation. A controller or processor, such as a rig controller or the surface processing unit 32, is configured to control various parameters of the drilling operation, such as drilling fluid flow rate/pressure, rotational rate, fluid properties, weight-on-bit and others.

In the second stage 42, downhole information is collected using one or more downhole tools, e.g., logging-while drilling (LWD) tools. Time based data is collected using one or more measurement tools. For example, a measurement tool includes gravity or bending moment sensors that measure inclination. Other examples of measurements include directional measurements such as azimuth measurements that may be performed using a magnetic azimuth sensor.

In the third stage 43, the time based data, such as inclination data, is recorded and analyzed in conjunction with time-depth data to generate depth based data. The depth based data, in one embodiment, is generated by combining the time based data with a time-depth profile.

Acquiring the time based data and the time-depth data may be accomplished in various ways. In one embodiment, inclination data (e.g., a time based inclination profile) is acquired directly in real time from downhole sensor measurements. For example, inclination data is acquired as a time based inclination profile from one or more downhole inclination sensors. The time-depth information may be obtained downhole and/or at the surface.

If the method is performed downhole by a processor, the time-depth information can be derived from downhole information, such as measurements taken by a measurement-while-drilling (MWD) tool. For example, depth can be estimated downhole by identifying the points of each connection by measuring the time between flow off and flow on or RPM changes. Depth measurements can also be performed at the surface, e.g., by measuring pipe and pipe segment lengths as they are deployed. Such measurements can be analyzed at the surface and transmitted downhole, e.g. by wired pipe and/or mud pulse telemetry.

If the method is performed at the surface, the time-depth profile is acquired based on surface measurements, and the time based data may be acquired by taking data stored in a database, or acquiring the data from downhole. For example, inclination or other time based data is communicated to the surface by a communication channel (e.g. mud pulse telemetry) or high speed real-time data (e.g. wired pipe).

In the fourth stage 44, a processor analyzes the depth based inclination data (or other depth based data) to determine whether spiraling is occurring at one or more depths or depth intervals. In one embodiment, the depth based data is transformed into a frequency domain by a Fourier transform or fast Fourier transform (FFT). Relatively high amplitudes or energy values at specific frequencies or wavenumbers can be considered to indicate spiraling. In addition, specific frequencies or frequency ranges can be selected that correspond with selected locations along the drill string. Amplitudes or energies at a selected frequency that exceed a selected threshold are indicated as a spiraling event occurring at the associated location. In one embodiment, the deflection from the centerline of the borehole at the associated location is estimated based on inclination data.

In the fifth stage 45, remedial action is taken in response to detecting spiraling, and/or in response to detecting spiraling having at least a selected severity. Examples of remedial actions include notifying a user or processor, changing one or more operational parameters, stopping the operation, etc.

Figure 3:
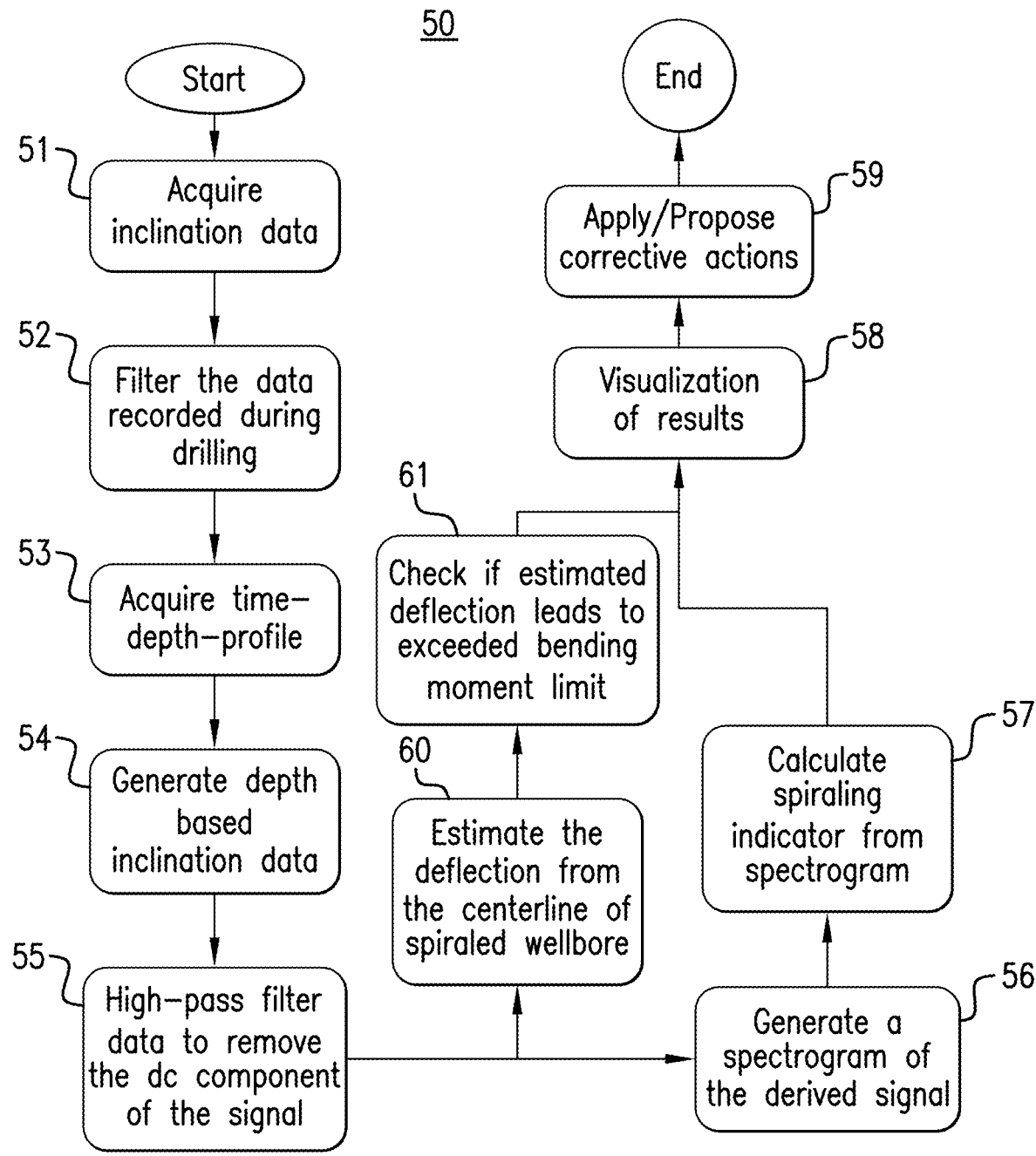
FIG. 3 is a flow chart illustrating an embodiment of a method of detecting and assessing spiraling, and estimating associated deflection.

FIG. 3 is a flow chart of an exemplary method 50 for performing real time and/or offline spiraling detection and assessment. The method 50 can be performed at a surface location or processor, at a downhole location or a combination of both. At block 51, time based data is acquired, e.g., by a downhole sensor or tool. In one embodiment, the time based data includes directional data such as inclination data. Other time based data may include the downhole bending moment and/or azimuthal measurements. At block 52, the measurement data may be filtered, e.g., to reduce noise. At block 53, a time-depth profile is acquired. The time-depth profile can be acquired using surface and/or downhole measurements or estimation techniques.

At block 54, after the time based data and time-depth-profile are acquired, they are combined to generate a depth based inclination signal. At block 55, the DC component of the inclination signal is removed. This can be done, for example, by filtering the whole signal with a high pass filter. This filtering may or may not need to be performed. For example, this filtering is not necessary if spiraling due to downhole motors or generators is being estimated.

At block 56, the derived DC component free signal is processed to transform the depth based signal to a frequency domain. For example, the signal is processed with a fast Fourier transformation (FFT) or a spectrogram (multiple FFTs with fixed window size).

At block 57, a spiraling indicator is calculated. From the FFT or spectrogram, wavenumbers corresponding to wavelengths of interest can be analyzed. The wavenumbers in this example are reciprocals of wavelength. The wavelengths of interest are, for example, the distance along the borehole between a drill bit, BHA or other reference location and a location of interest on the drill string. Exemplary locations are locations at which downhole components (e.g., stabilizers) can contact the borehole wall. For example, wavenumbers are selected that correspond to the distance between a drill bit and the first and/or second borehole wall contact above the bit, respectively. If there is an accumulation of energy around the wavenumber of interest, this is an indicator for hole spiraling.

In one embodiment, hole spiraling at a wavenumber and corresponding location of interest is indicated if the energy around the wavenumber of interest is compared to the energy in the rest of transformed frequency based signal. If the energy exceeds a predefined limit, hole spiraling is indicated. At block 58, the spiraling indicator is presented to a user or processor (e.g., processing unit or controller), e.g., by displaying or visualizing the spiraling indicator. At block 59, corrective actions can be applied or proposed. Such corrective actions may include informing a driller or passing the data to an automated system that can address the spiraling event.

Still referring to FIG. 3, in one embodiment, the filtered inclination signal can be used to estimate the deflection from the centerline of the borehole or the centerline of a spiraled section of the borehole (block 60). At block 61, the estimated deflection can be used to check the spiraling influence on the bending moment and determine whether the bending moment at the location of interest is exceeded. The deflection information may be presented with the spiraling indicator to a user/driller or control device so that appropriate action can be performed.

Figure 4:
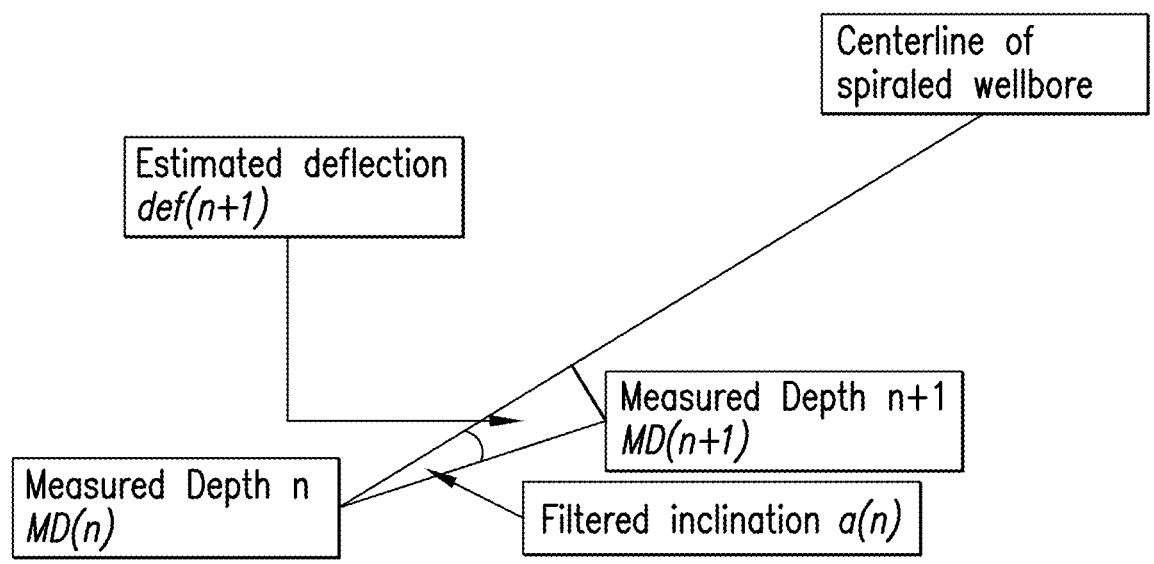
FIG. 4 depicts parameters used in an embodiment of a method for estimating deflection based on inclination measurements.

FIG. 4 illustrates aspects of the estimation of spiraling deflection described above. The amount or magnitude of deflection associated with identified spiraling events can be estimated based on the depth based inclination data. For example, the deflection at a depth n+1 (def (n+1)) is estimated based on the following equation:

$$\text{def}(n+1) = \text{def}(n) + (MD(n+1) - MD(n)) * \tan(\alpha(n)),$$

where MD(n) is the measured depth at a location n, and MD(n+1) is the measured depth at a second location (e.g., further along the borehole from the surface). α(n) is the inclination at depth n, and def (n) is the deflection at depth n. The deflection may be considered zero, e.g., at locations near the surface, or may be a value of the deflection calculated based on the above equation at a previous depth.

Figures 1, 5:
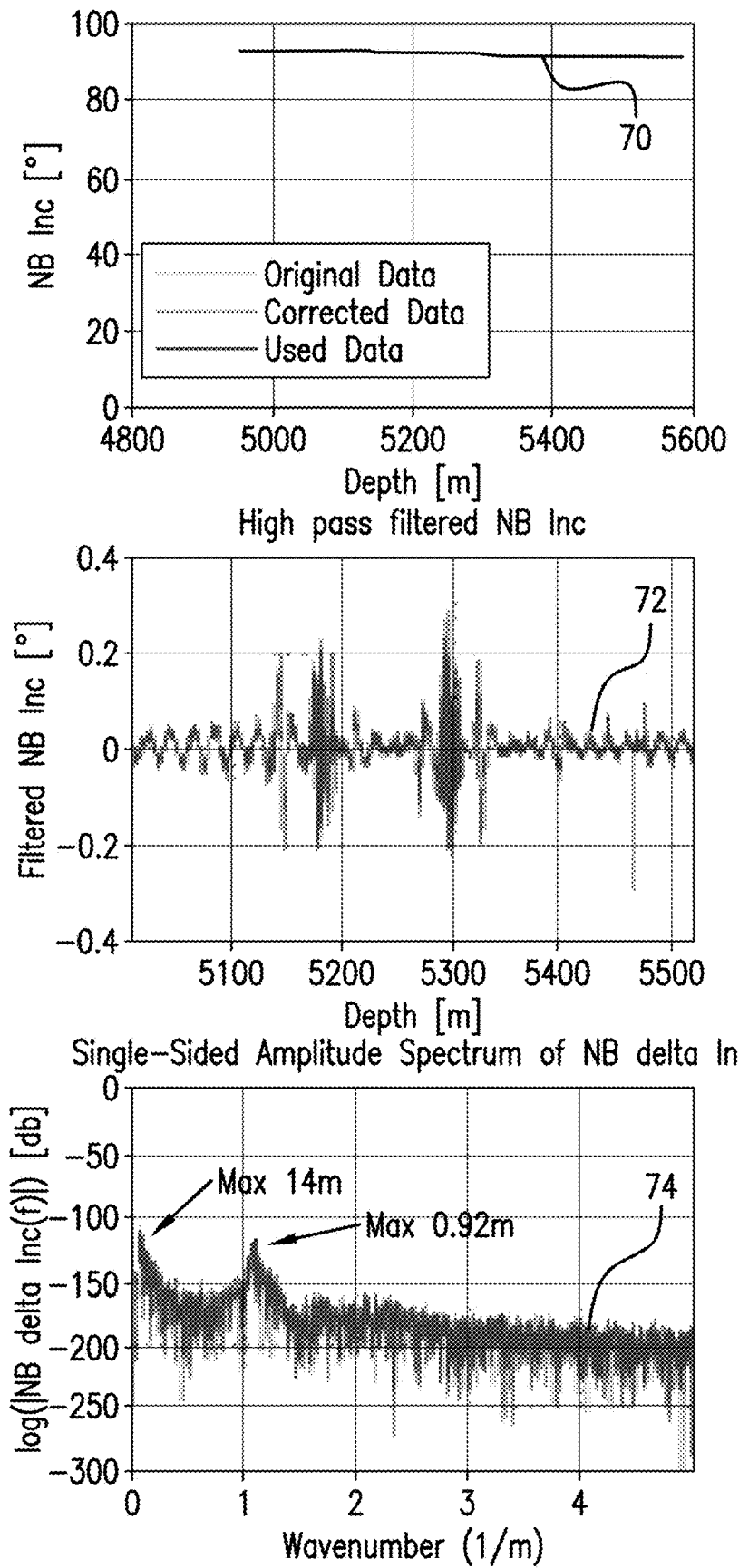
Figures 2, 5:
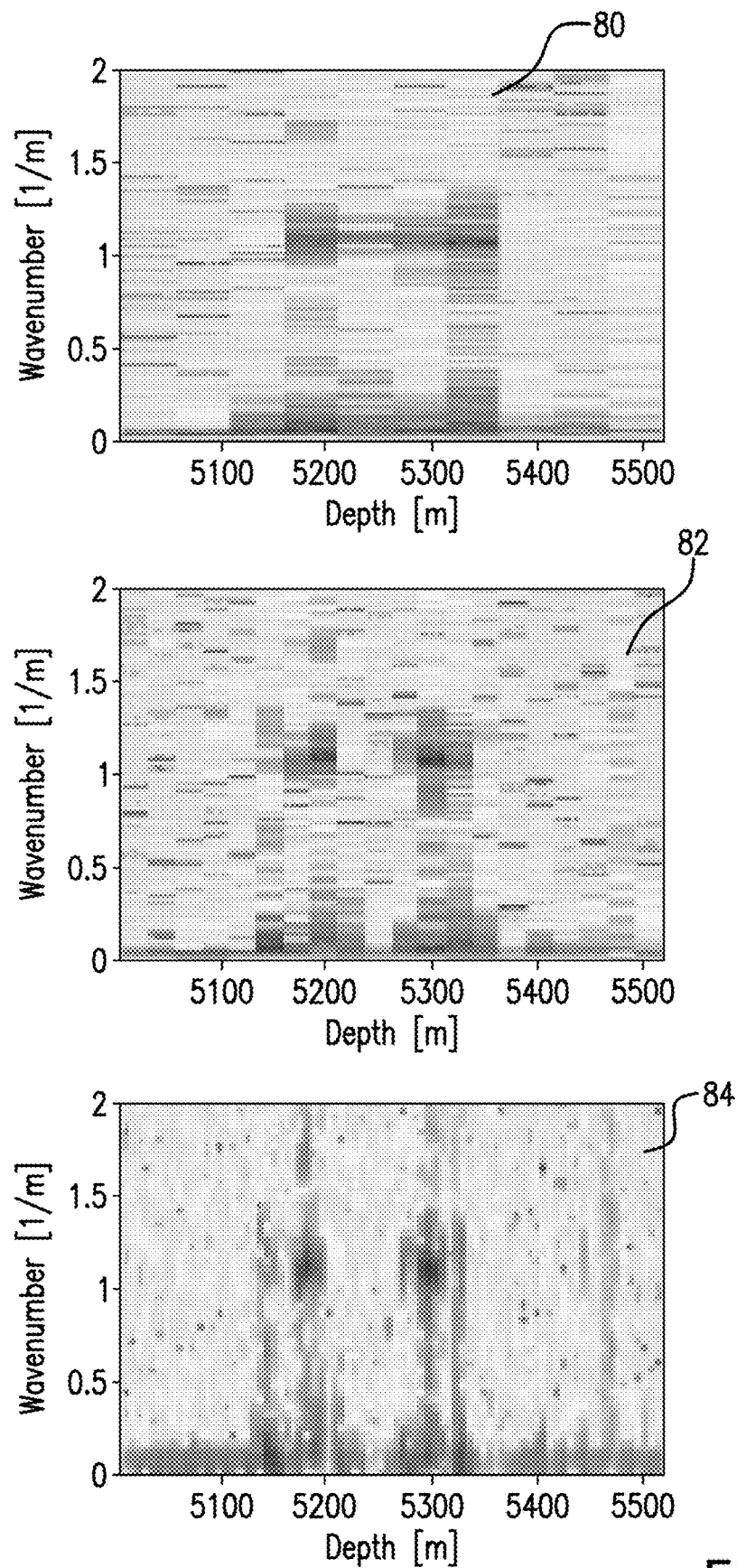
Figures 3, 5:
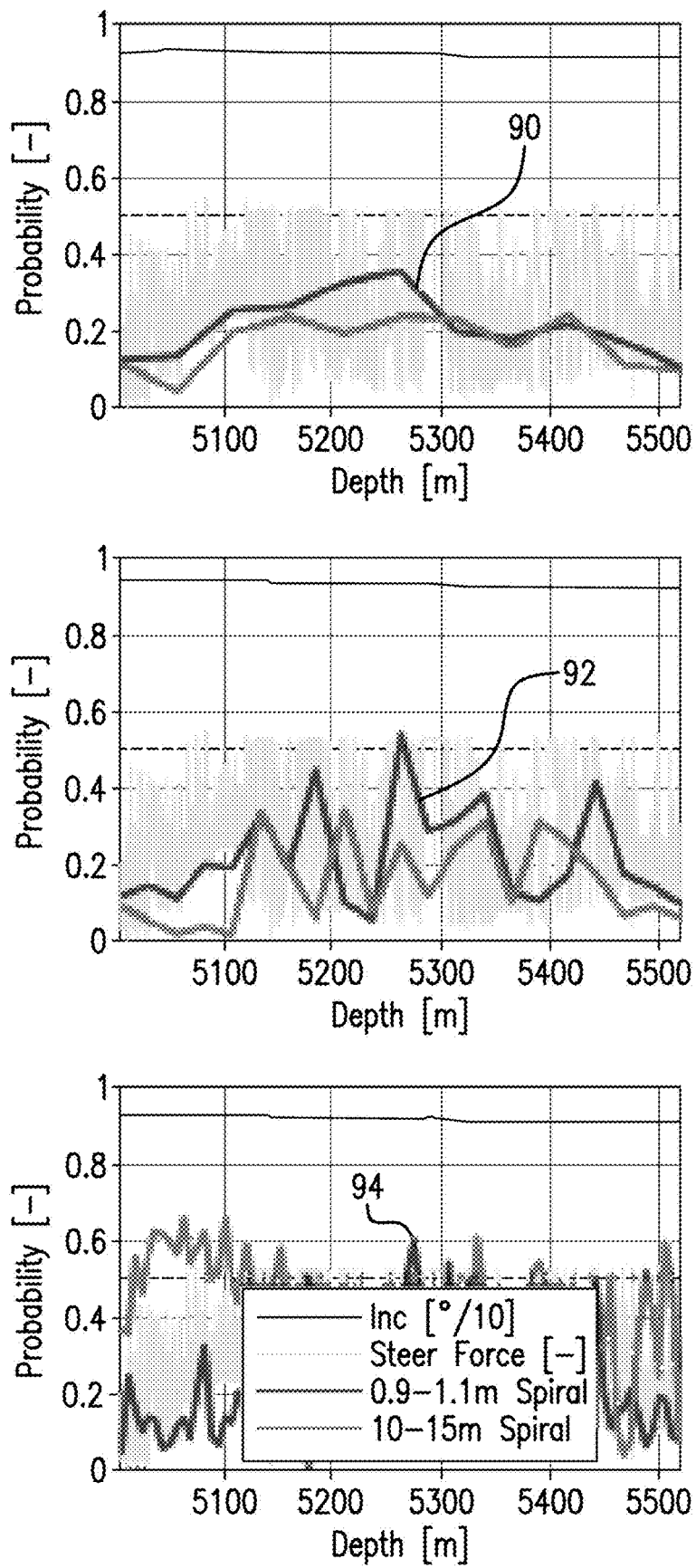
Figures 1, 6:
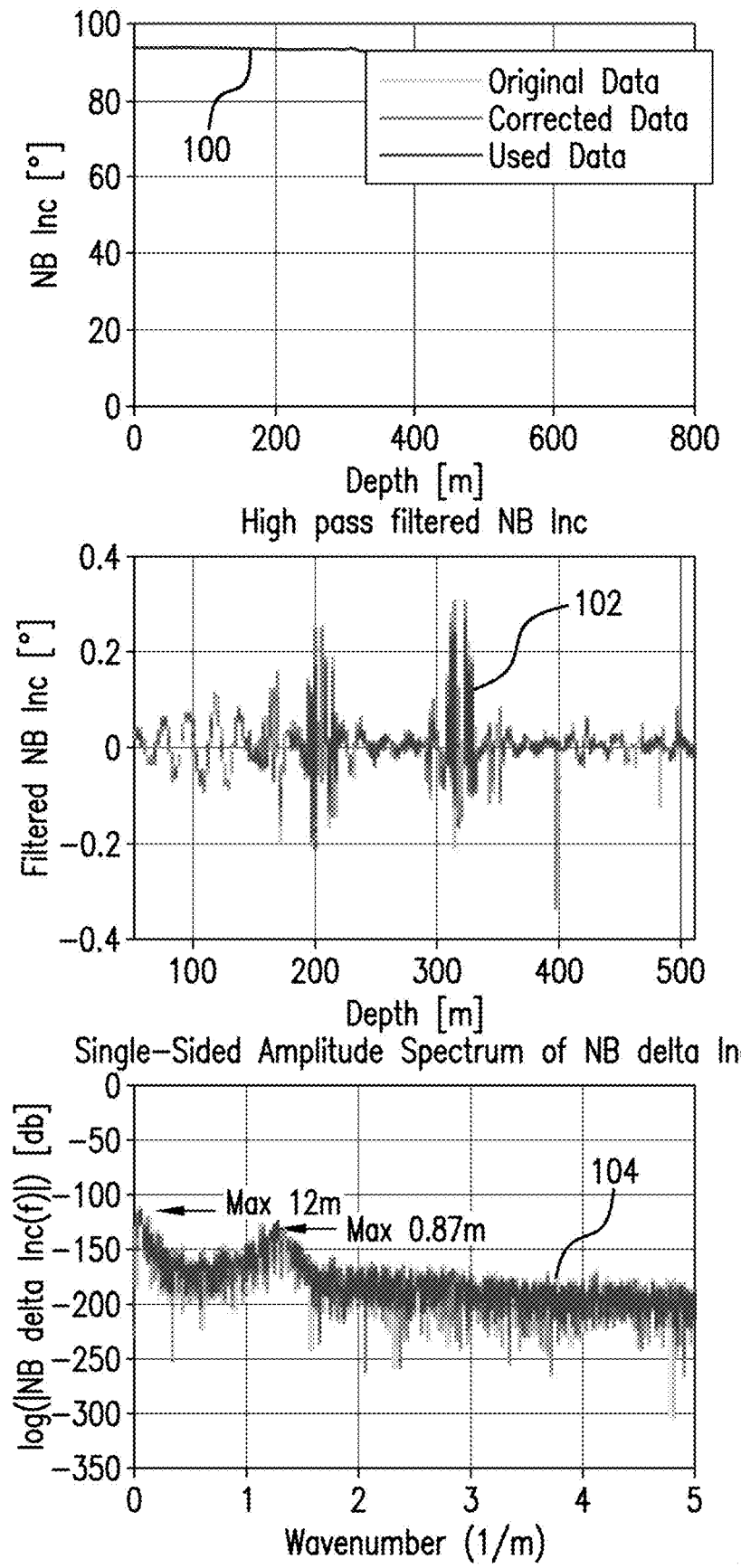
Figures 2, 6:
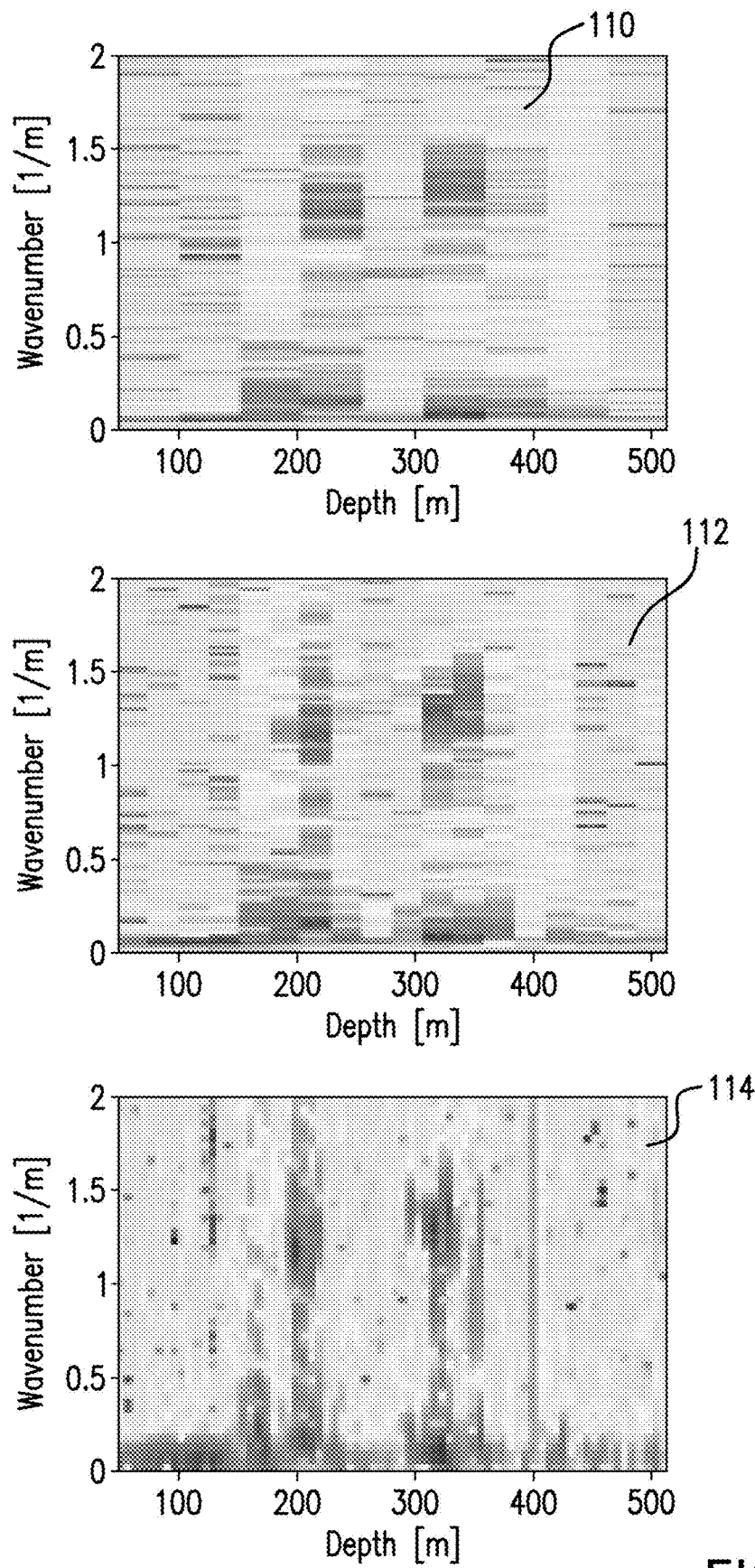
Figures 3, 6:
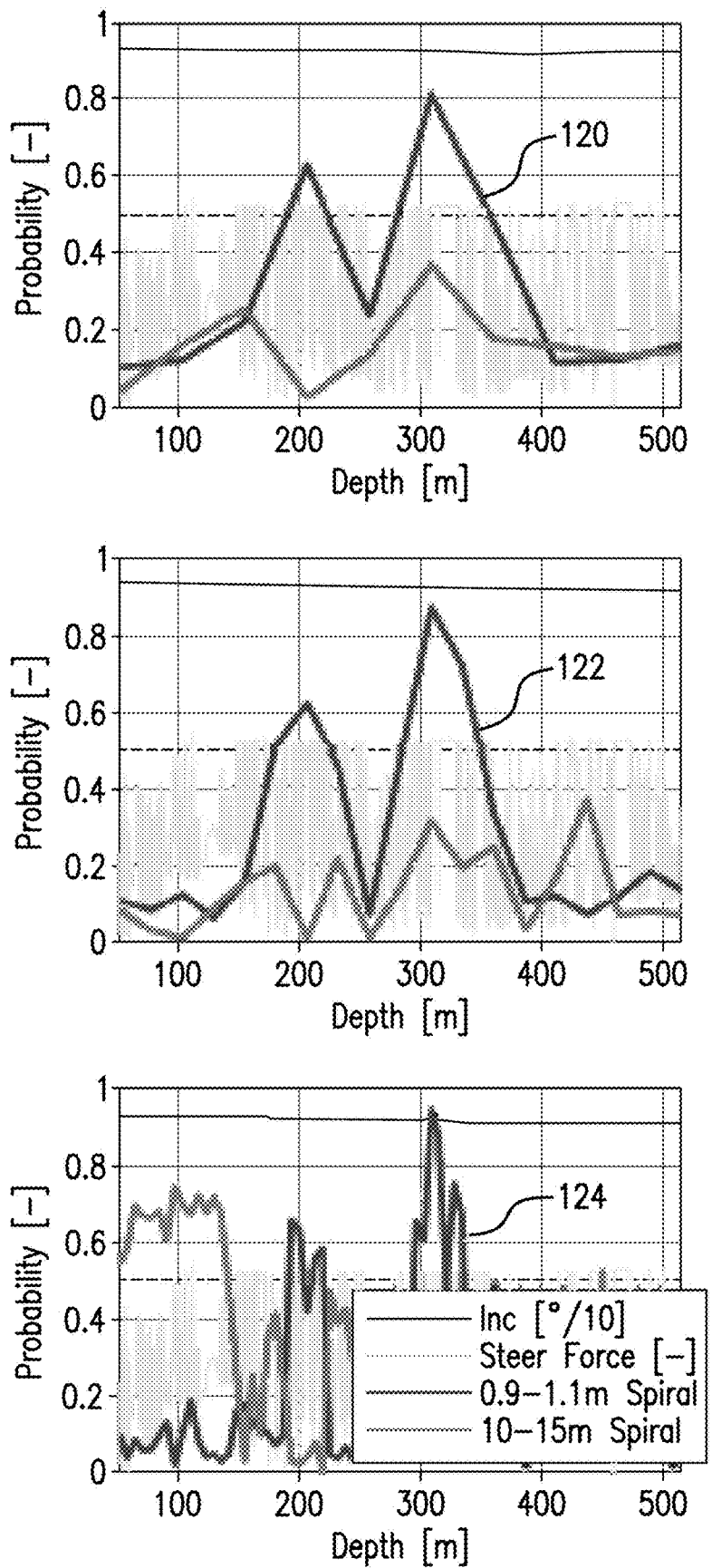

FIGS. 5 and 6 show exemplary measured and processed data according to the methods described herein. FIGS. 5-1, 5-2 and 5-3 (collectively referred to as FIG. 5) shows depth based inclination data 70 prior to filtering and frequency transformation, inclination data 72 after filtering, and inclination data 74 after filtering and frequency transformation as discussed above. The inclination data in this example was derived based on real-time mud pulse data generated downhole. The data shown in FIG. 5 was generated using a time-depth profile acquired from surface measurements.

Data set 70 is the raw inclination signal, which was derived based on combining time based inclination data with time-depth data. Data set 72 is the raw signal filtered to remove the DC component, and set 74 is the fast Fourier transform of the data set 72. Spectrograms 80, 82 and 84 are spectrograms of the filtered depth based inclination data. The spectrograms differ by the depth window size used; spectrogram 80 has the largest window size, spectrogram 82 has a smaller window size and spectrogram 84 has the smallest window size. Probability functions 90, 92 and 94 are the corresponding indicator plots showing the likelihood of spiraling. Functions 90, 92 and 94 correspond to spectrograms 80, 82 and 84 respectively.

Probability functions 90, 92 and 94 (also referred to as indicators) show the data at a predefined wave length or frequency range (e.g., a wavenumber of interest) in relation to the full data. In case of perfect spiraling, an indicator will show a value of 1 (one), otherwise the indicator will have a value between 0 and 1. A threshold of 0.5 has been selected for these examples to indicate whether spiraling occurred or not.

The probability functions are shown as a line relative to a threshold, which in this example is 50% of the total probability. The probability functions are for a wavenumber or wavelength of interest, which corresponds to a distance along the string from the bit. In this example, the wavenumber of interest corresponds to a distance from the bit of about 0.9 m. As shown in FIG. 5, the data 74, which was generated according to the methods described herein, shows a clear peak around the wavenumber of interest. In addition, the probability functions 90, 92 and 94 represent the energy at the wavenumber of interest relative to the whole string (or portion thereof corresponding to selected depth window). The probability function 94 clearly shows spiraling at the wavenumber of interest at a depth between 5200 and 5300 m, as the function at that depth exceeds the threshold.

FIG. 5 demonstrates the impact on depth window size selection in generating a probability function or spiraling indicator. For example, spectrogram 84 (having the smallest window size) shows two spiraling events at approximately 5200 meters and 5300 meters. These events can be seen as dark areas near the region representing wavenumber 1. Using the smallest window size, these events can be clearly seen as peaks in the indicator 94 (note the second peak between 5250 and 5300 meters). Indicators 90 and 92 show the effect of increasing the window size. As the window size increases, the resolution in the depth direction gets worse while the resolution in the wavenumber direction increases. As a result, the second peak is less visible (has a lower probability value) in indicator 92, and is virtually unidentifiable in indicator 90. This shows that the correct window size should be used in order to generate an accurate indicator. On the one hand, a large window size is needed to determine spiraling with very low wavenumbers, but as a result, local spiraling events occurring with high wave numbers can be missed. Thus, in order to detect more localized spiraling events, a smaller window size should be selected.

FIGS. 6-1, 6-2 and 6-3 (collectively referred to as FIG. 6) shows exemplary data acquired along with depth data derived from tracking connection points in the drill string. The raw data (data set 100), filtered data (data set 102) and frequency domain data (data set 104) are generated using the same time based inclination data as that used in FIG. 5. However, in this example, the time-depth profile is taken exclusively using downhole depth measurements or estimations. The depth information in this example is based on connections between portions of the drill string that have been performed. Since the downhole starting point may not be known, the depth values in FIG. 6 are relative depth values that start at zero. The spectrograms 110, 112 and 114 are generated using successively smaller depth windows. The probability functions 120, 122 and 124 in this example represent successively smaller windows, correspond to a distance of about 0.9 m from the bit, and are compared to a 50% energy threshold. The filtered and transformed data set 104 shows a clear peak around the wavenumber of interest, and the probability functions 102, 122 and 124 clearly show spiraling at the wavenumber of interest at a depth near 300 m, with a greater accuracy as the window gets smaller. FIG.

6 demonstrates that, even in cases where the depth profile is estimated based only on downhole estimations, spiraling can be effectively detected, which shows that the methods described herein would also work in real time.

The embodiments described herein have numerous advantages, including allowing for real time automatic detection of spiraling, so that spiraling conditions can be quickly identified and addressed. Embodiments also provide for estimating the magnitude of deflection associated with spiraling, which allows drillers or other users to set thresholds at which spiraling is considered to significantly affect drilling trajectory or other operational conditions. For example, deflections of one or two millimeters can be significant and can compromise the quality of other measurements performed downhole. A driller can set the threshold to be alerted to spiraling of this magnitude. In addition, for tools or conditions in which spiraling has less of an effect, the driller can set the threshold higher.

In support of the teachings herein, various analysis components may be used, including a digital and/or an analog system. For example, the downhole electronics 30, the surface processing unit 32, the downhole sensors 24, a drill rig controller, or surface drilling parameter sensors may include digital and/or analog systems. The system may have components such as a processor, storage media, memory, input, output, communications link (wired, wireless, mud pulse, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to a structural limitation of an apparatus that allows the apparatus to perform the task or function for which the apparatus is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting and correcting for spiraling in a downhole carrier, the method comprising:
   deploying the downhole carrier in a borehole in an earth formation as part of a subterranean operation;
   collecting parameter data by measuring a parameter with at least one sensor disposed at the downhole carrier;
   generating, from the parameter data, a spectrum;
   analyzing the spectrum to detect a spiraling event in the downhole carrier by identifying a frequency having an amplitude within the spectrum that exceeds a threshold; and
   taking a corrective action based on detecting the spiraling event.

2. The method of claim 1, wherein the collected parameter data is depth based parameter data and the spectrum is generated from parameter data in a selected depth window.

3. The method of claim 1, wherein the spectrum is generated by a Fourier Transformation.

4. The method of claim 1, wherein the downhole carrier is a drill string and the subterranean operation is drilling into the earth formation, and detecting the spiraling event includes evaluating at least one of the frequency, a wavelength, and a wavenumber of the spectrum that corresponds to the identified amplitude.

5. The method of claim 4, wherein the at least one of the frequency, the wavelength and the wavenumber corresponds to a distance along the downhole carrier between a drill bit and a component that contacts a borehole wall during drilling.

6. The method of claim 1, further comprising generating a spectrogram, wherein the spectrogram comprises at least a first and a second spectrum.

7. The method of claim 1, wherein the amplitude correlates with an energy value, and the threshold is based on a total energy of the spectrum.

8. The method of claim 1, wherein the corrective action is selected from at least one of alerting a user and changing an operational parameter.

9. The method of claim 1, wherein detecting the spiraling event is performed while the downhole carrier is deployed in the borehole during the subterranean operation.

10. The method of claim 1, wherein the parameter data is at least one of directional data and bending moment data.

11. The method of claim 1, further comprising estimating a deflection associated with the detected spiraling based on the parameter data.

12. The method of claim 1, further comprising applying a filter to the parameter data prior to generating the spectrum.

13. A system for detecting and correcting for spiraling in a downhole carrier, the system comprising:
 the downhole carrier configured to be deployed in a borehole in an earth formation as part of a subterranean operation;
 at least one sensor disposed at the downhole carrier, the at least one sensor configured to collect parameter data; and
 a processor configured to perform:
  generating from the parameter data a spectrum;
  analyzing the spectrum to detect a spiraling event in the downhole carrier by identifying a frequency having an amplitude within the spectrum that exceeds a threshold; and
  taking a corrective action based on detecting the spiraling event.

14. The system of claim 13, wherein the collected parameter data is depth based parameter data and the spectrum is generated from parameter data in a selected depth window.

15. The system of claim 13, wherein the downhole carrier is a drill string and the subterranean operation is drilling into the earth formation, and detecting the spiraling event includes evaluating at least one of the frequency, a wavelength, and a wavenumber of the spectrum that corresponds to the identified amplitude, the at least one frequency, wavelength, and wavenumber corresponding to a distance along the downhole carrier between a drill bit and a component that contacts a borehole wall during drilling.

16. The system of claim 13, wherein the amplitude correlates with an energy value, and the threshold is based on a total energy of the spectrum.

17. The system of claim 13, wherein the processor is configured to detect the spiraling event while the downhole carrier is deployed in the borehole during the subterranean operation.

18. The system of claim 13, wherein the parameter data is at least one of directional data and bending moment data.

19. The system of claim 13, wherein the processor is further configured to estimate a deflection associated with the detected spiraling based on the parameter data.

20. The system of claim 13, wherein the processor is further configured to apply a filter to the parameter data prior to generating the spectrum.

* * * * *